Patented Mar. 18, 1947

2,417,541

UNITED STATES PATENT OFFICE 2,417,541

VITAMIN B₆ INTERMEDIATES

Gustaf H. Carlson and Frederick J. Pilgrim, Pearl River, N. Y., assignors, by mesne assignments, to American Cyanamid Company, New York, N. Y., a corporation of Maine No Drawing. Application June 25, 1942,
Serial No. 448,496

4 Claims. (Cl. 260—295.5)

This invention relates to new chemical compounds and more particularly it relates to an intermediate for use in the preparation of vitamin B₆ and to a process of preparing the same.

The compounds made in accordance with the present invention may be represented by the following formula:

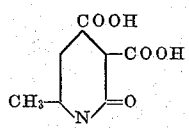

and salts thereof.

The invention will be illustrated in more detail in conjunction with the following specific example.

Preparation of 2-methyl-4,5-dicarboxy-pyridone-6

A suspension of 5 g. of the amide of 2-methyl-4-carboxy-5-cyanopyridone-6 in 50 cc. of concentrated hydrochloric acid was treated, at 0° C., with a solution of 1.95 gr. of sodium nitrite in 10 cc. of water. After thirty minutes at 0° C., the solution was heated on a steam bath for forty-five minutes, solvent was removed in vacuo and the residue (4.9 g.) was extracted with acetone. The filtered solution was concentrated, then diluted with ether and yielded 2.2 g. of the dicarboxylic acid, M. P. 211–213° C. with decomposition, which, after recrystallization, melted at 222° C. with decomposition.

The amide employed in the above example may be prepared by treating 2-methyl-4-carbethoxy-5-cyanopyridone-6 with alcoholic ammonia.

The conditions for bringing about the hydrolysis may be varied and acids other than nitrous acid, such as for example, sulfuric, sulfurous, hydrochloric, etc., may be employed for hydrolyzing the cyano and amide groups, it being understood that the above specific example merely represents an hydrolysis employing the preferred acid and conditions.

When desired, our dicarboxy pyridone may be converted into salts by treatment with appropriate inorganic or organic bases.

It is obvious that the description and example are intended to be illustrative only and that they may be varied or modified to a considerable extent without departing from the spirit of the invention or sacrificing the advantages thereof. We do not, therefore, intend to limit ourselves to the specific embodiments herein set forth except as indicated in the appended claims.

The compound 2-methyl-4,5-dicarboxy pyridone-6, claimed in the present invention, is useful as an intermediate for producing the esters claimed in our copending application Serial No. 448,495, filed June 25, 1942.

We claim:

1. The process which comprises hydrolyzing an amide of 2-methyl-4-carboxy-5-cyanopyridone-6 to produce 2-methyl-4,5-dicarboxy pyridone-6 by treatment with an aqueous solution of a mineral acid and thereafter recovering the said 2-methyl-4,5-dicarboxy pyridone-6.

2. The process for hydrolyzing the amide of 2-methyl-4-carboxy-5-cyanopyridone-6 which comprises treatment with a nitrous acid solution to give 2-methyl-4,5-dicarboxy pyridone-6 and thereafter recovering said 2-methyl-4,5-dicarboxy pyridone-6.

3. A compound of the group consisting of 2-methyl-4,5-dicarboxy pyridone-6 and salts thereof.

4. The compound 2-methyl-4,5-dicarboxy pyridone-6.

GUSTAF H. CARLSON.
FREDERICK J. PILGRIM.

REFERENCES CITED

The following references are of record in the file of this patent:

Beilstein, vol. XXII, page 269.
Journal Chemical Society, 1929, page 2223.
Journal Organic Chemistry, vol. 7, page 293.
Chem. Abstracts, vol. 35, page 6960.
Berichte 72B (1939), page 309. (Copy in Pat. Office Library.)
Science Paper, Ichiba, Institute of Phys. Chem. Research. Tokyo 36, pages 173–7, July 1, 1939; and vol. 35 (1941), pages 347–352. (Photostats in Div. 59.)
Journal Amer. Chem. Soc., May 1939, vol. 61, pages 1242–1245.
Karrer, "Organic Chem.", pages 199 and 168, 1938. (Copy in Div. 59.)
Annalen 487, pages 127–134. (Copy in Pat. Office Library.)